United States Patent [19]
Raley

[11] Patent Number: 4,863,567
[45] Date of Patent: Sep. 5, 1989

[54] FLUID DISTILLATION APPARATUS

[76] Inventor: Jay F. Raley, 728 N. 20th St., San Jose, Calif. 95112

[21] Appl. No.: 198,469

[22] Filed: May 25, 1988

[51] Int. Cl.$^4$ .............................................. B01D 3/08
[52] U.S. Cl. ................... 202/182; 202/187; 202/197; 202/202; 202/205; 202/234; 202/235; 202/276.1; 165/88; 203/11; 203/26; 203/DIG. 1
[58] Field of Search ............... 202/205, 182, 187, 197, 202/180, 238, 267.1, 234, 176, 235; 203/91, 40, 4, 26, 24, 10, 11, DIG. 17, DIG. 22, DIG. 1, 86; 159/24.1, 24.2, 903, DIG. 35, 6.1, 11.1, 11.2; 165/88

[56] References Cited

U.S. PATENT DOCUMENTS

| | | | |
|---|---|---|---|
| 1,936,524 | 11/1933 | Placek | 202/236 |
| 1,966,938 | 7/1934 | Stone | 203/26 |
| 2,589,406 | 3/1952 | Latham | 203/24 |
| 2,636,129 | 4/1953 | Agnew | 159/DIG. 31 |
| 3,091,577 | 5/1963 | Pequignot | 203/86 |
| 3,096,255 | 7/1963 | Redenbaugh | 203/11 |
| 3,505,173 | 4/1970 | Randell | 159/DIG. 31 |
| 3,803,001 | 4/1974 | Carnavos | 159/DIG. 31 |
| 4,198,361 | 4/1980 | Shafranovsky et al. | 159/6.1 |
| 4,671,856 | 6/1987 | Sears | 159/DIG. 31 |
| 4,710,272 | 12/1987 | Passarelli et al. | 202/205 |

Primary Examiner—Wilbur Bascomb
Attorney, Agent, or Firm—Michael J. Hughes

[57] ABSTRACT

The invention is a fluid distillation apparatus (10) which, in its preferred embodiment, includes a cylindrical portion (12) which mates with an end wall (14) and a bell portion (16) to form an enclosed volume (18) within which evaporization and condensation of a selected fluid may take place. A heat exchange rotor assembly (20) is formed of head conductive material and includes intertwined evaporization and condensation channels (52, 54) in spiral array. A central tunnel (58) provides access for vapor from an evaporization volume (24) to a condensation volume (26) with a pressure gradient provided by an impeller (100) urging such passage. A drum motor (68) rotates the drum (40) to facilitate liquid flow in the heat exchange rotor (20). An impure fluid input port (32) and output ports are provided for purified fluid (34), concentrated brine (36) and degassing purposes (38). The apparatus is a flow process device and is especially adapted for continuous purification, such as water distillation or desalinization.

17 Claims, 4 Drawing Sheets

FLUID DISTILLATION APPARATUS

TECHNICAL FIELD

The present invention relates generally to heat exchange devices and fluid purification devices and more specifically to fluid purifiers and distillers operating on a heat exchange principle.

BACKGROUND ART

Since prehistoric times humankind has engaged in efforts of an endless variety in attempts to purify fluids of different natures. Endeavors in this area have ranged from attempts to make brackish water drinkable to methods and devices for increasing the potency of alcoholic beverages. Various methods have been based on processes involving different miscibilities of fluids, filtration, chemical extraction processes and others. However, one of the best tried and true methods of purification has involved the evaporization and subsequent condensation of the fluid, commonly known as distillation.

Distillation is one of the primary methods for purifying brackish or otherwish impure water and also for purifying other liquids. Problems occurring with the distillation type processes are that it is difficult to handle this type of operation in a continuous flow process manner, usually a batch process method is more easily accomplished. Furthermore, distillation processes are difficult to operate when the liquid to be purified includes impurities having vaporization and condensation points very near to that of the desired liquid. Other problems with distillation processes is that they frequently require substantial external energy to be supplied in order to boil the desired liquid. Finally, distillation apparatus is frequently subject to the formation of deposits on the interior surfaces thereof from crystalized impurities, and prior art distillation mechanisms are typically difficult to clean.

Notwithstanding all of the above difficulties the distillation process has proved over time to be one of the most efficient and best understood of those available for purifying liquids. Accordingly, a large number of United States Patents have been issued on inventions relating to distillation apparati for various purposes. The majority of these patents have related to purification of either water or ethyl alcohol.

Several United States Patents are on devices utilized to purify water utilizing a boiling technique and a cooling column for recondensing the vaporized liquid. Two examples of this approach are found in U.S. Pat. No. 4,601,789, issued to J. G. Bjorklund for a "Water Purification Apparatus" and U.S. Pat. No. 4,690,102, issued to G. Sundquist for "Water Heater and Distiller Apparatus". Other devices have primarily utilized the concept of preheating the incoming fluid by contact, either directly or through heat exchange mechanisms, with the already heated vapor. Devices of this type are reflected in U.S. Pat. No. 4,342,625, issued to C. C. Dennison for a "Modular Automatic Water Distiller" and in U.S. Pat. No. 4,687,550, issued to M. J. Wong for a "Water Distiller".

Another conceptual approach to enhancing the efficacy of water distilling techniques is the use of varying pressure on the components to enhance vaporization and condensation phase changes. An example of this approach is found in U.S. Pat. No. 4,686,009, issued to D. L. McCabe for a "Distillation System".

Another conceptual approach is to cause the fluids to pass through a convoluted series of plates which will either heat or cool the fluids as they pass the plate surfaces. Some examples of this approach are found in U.S. Pat. No. 4,585,524, issued to J. Hoiss for a "Method and Apparatus for Distillation of Crude Water", an apparatus which is applicable to demineralized fluid, U.S. Pat. No. 4,475,988, issued K. Tsumura, et al., for a "Process for Distilling Water and Distillation Apparatus", which utilizes alternating hot and cold plates, and in U.S. Pat. No. 3,398,060, issued to J. J. Cowley, for a "Process for Continous Regenerative Distillation of Impure Water", which utilized expanding or decreasing volumes to modify the pressure in addition to a convolution scheme.

Although each of the prior art devices discussed above and many others which are found in the art are effective for various particular purposes, all suffer from one or more of the above stated disadvantages. Accordingly, there remains substantial ground for improvement of the process, particularily in an low-end encomical procedure.

SUMMARY OF THE INVENTION

Accordingly, it is an object of the present invention to provide a liquid purification/distillation apparatus which operates on a continuous flow basis.

Another object of the present invention is to provide a distillation assembly which may be operated, if desired and the ambient conditions permit, without external heating.

It is a further object of the invention to provide a distillation apparatus which may be operated with very low power requirements.

It is yet another object of the present invention to provide a distillation apparatus which may be utilized with a wide variety of liquids without substantial modification of the apparatus.

It is still another object of the present invention to provide a continous flow purification apparatus which is capable of removing impurities having lower vaporization temperatures than the primary fluid as well as those having higher vaporization temperatures.

Briefly, the preferred embodiment of the present invention is a distillation apparatus particularly adapted for purifying liquids by evaporation and subsequent condensation within a rotating convoluted heat exchange module. The preferred embodiment of the distillation assembly is adapted to be utilized on a small scale for use in preparing limited quantities of purified liquids, although large scale operations utilizing enlarged models of the same components would also be feasible. The preferred embodiment of the invention includes a enclosed volume, in the form of a elongated cylinder, which is effectively divided into an evaporization side and a condensation side. The passage of material from the evaporization side to condensation side is possible only in vapor phase. A convoluted heat exchange component constructed of a materials having a high degree of thermal conductivity permits heat exchange between the evaporization side and the condensation side while also providing the flow path for liquids and vapors through the exchange component. A unique feature of the invention is that the exchange component rotates to facilitate convective liquid contact with the exchanger surface so that maximal conductive heat transference takes place. A motor causes the exchanger, in the form of a drum having dual separate spiral elements, to rotate so as to cause liquids in both of the spiral arms to flow towards the respective centers thereof. In the case of the evaporization side, the liquids are caused to flow towards a central tunnel which has an opening through which gases may pass to the condensation side while nonevaporated liquids are delivered to a concentrated brine collector. The condensation side spiral delivers condensed liquid to a center pipe which then extends to a purified liquid collection point. The rotation of the drum also facilitates continuous wetting of the drum surface, thus inhibiting deposition of impurities (scale). An impeller type fan mechanism is utilized to maintain a relatively lower pressure on the condensation side so as to draw vapors from the evaporization side to the condensation side during operation.

An advantage of the present invention is that it utilizes a relatively small amount of energy, with only the electrical energy necessary to turn the heat exchange rotor and the fan being required for operation.

Another advantage of the present invention is that it is adapted to be relatively inexpensive to that it may be utilized for small volume operations such as remote dwellings and installations.

A further advantage of the invention is that the rotating exchanger assembly ensures a continuous flow operation with effective heat transfer, while minimizing deposit formation by continually rewetting the surface.

Still another advantage of the invention is that the interior may be totally isolated from the surrounding atmosphere, thus allowing operating at varying internal pressures and further preventing the escape of potentially harmful materials.

Yet another advantage of the present invention is that it is able to operate without external heating apparatus, although it may be adapted for use therewith.

A further advantage of the present invention is that the transparent casing of the enclosed volume may be utilized to permit the utilization of solar energy to heat the contents and thus increase the purification rate.

Another advantage of the present invention is that the thermal energy equilibrium enchancement provided by the convoluted highly thermally conductive exchange assembly acts to maximize evaporation on the evaporization side and condensation on the condensation side.

Still another advantage of the present invention is that it operates as a continuous flow process and requires no specific adjustments or maintenance during operation.

A still further advantage of the present invention is that it is compact, quiet and safe such that it does not require installation at points remote from habitations.

Still another advantage of the present invention is that it is easily disassembled and reassembled for purposes such as cleaning.

These and other objects and advantages of the present invention will become clear to those skilled in the art upon review of the following specification, the accompanying drawings, and the appended claims.

BEST MODE OF CARRYING OUT THE INVENTION

The present invention is a liquid purification apparatus which operates by the principle of distillation. The preferred embodiment of the invention is in the form of a distillation apparatus adapted to operate with various types of liquids, although it is presumed that the most common usage will be in purifying water for drinking and other purposes. It is expected that the primary utilization of the present invention will be in low volume continuous processing of polluted or otherwise impure liquids such as desalination of sea water and treatment of polluted drinking water.

Figure 1:
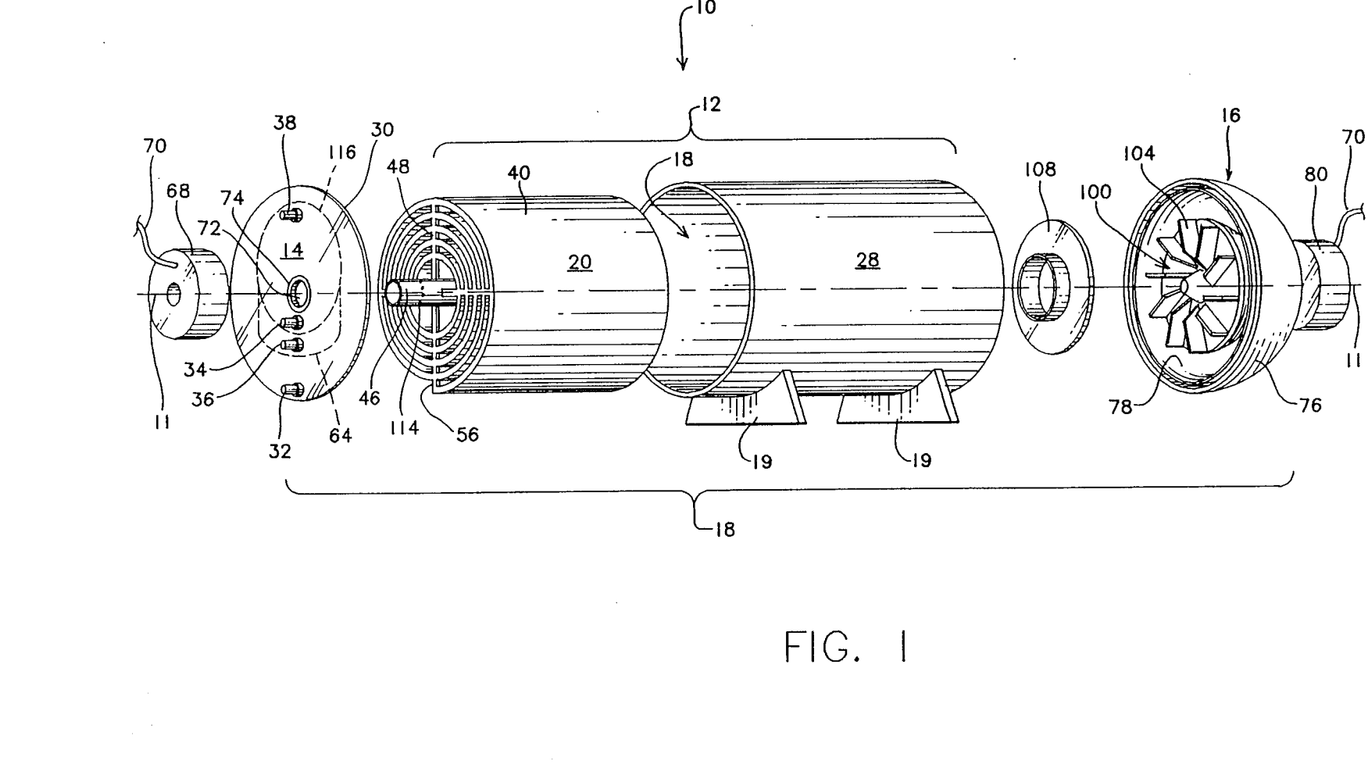
FIG. 1 is an exploded perspective view of the preferred embodiment of the distillation apparatus of the present invention.

The preferred embodiment of the present invention is a fluid distillation apparatus shown in an exploded perspective view in FIG. 1 and referred to by the general reference character 10. In the view of FIG. 1 it may be seen that the distillation apparatus 10 is generally radially symmetrical about a substantially horizontal central axis 11 and includes a central cylindrical portion 12 sealed at one end by an end wall 14 and enclosed at the other end by a bell portion 16. The cylindrical portion 12 together with the enclosing end wall 14 and bell portion 16 form an enclosed volume 18. An optional support structure 19 provides a stable base for holding the apparatus 10 in position. Situated within the enclosed volume 18 it is a heat exchanger rotor subassembly 20. The rotor subassembly 20 is coaxial with and formed within the cylindrical portion 12, with a fluid seal 22 existing at the end adjacent to the bell portion 16 so as to prevent liquid flow from an evaporization volume 24, defined as the volume accessible from the direction of the end wall 14 and a condensation volume 26 defined as the effective volume accessible from the direction of the bell portion 16. The rotor subassembly 20 is substantially shorter than the cylinder 12 in axial length such that an end chamber 27 (See FIG. 2) is formed intermediate the end wall and the rotor subassembly 20.

All passage of material into and out of the apparatus 10 is accomplished through a series of ports. In the preferred embodiment the various ports are all located in the end wall 14. The end wall 14 is formed to as to mate with a cylinder wall 28, which enclosed the cylindrical portion 12, with an end wall washer 30 inserted therebetween to insure a fluid and volume seal. In the preferred embodiment 10 both the end wall 14 and the cylinder wall 28 are transparent in order to permit observation of the operation of the apparatus 10 and further under some conditions to permit radiative heating of the contents of the enclosed volume 18, such as by solar energy.

The system of material passage ports situated in the end wall 14 include a fluid input port 32, situated in the lower portion of the end wall 14, a purified fluid output port 34 situated near the center axis 11, a concentrated brine output port 36 situated below the purified fluid output port 34, and a degassing port 38 situated near the top of the end wall 14. The fluid entering the enclosed volume 18 through the fluid input port 32 and that exiting through the concentrated brine output port 36 are contained within the end chamber 27 portion of evaporization volume 24 while the fluids and gasses exiting through the purified fluid output port 34, and the degassing port 38 arrive at these ports after passage through the condensation volume 26.

Although the description and discussion herein presumes that the evaporation volume 24 and the condensation volume 26 are effectively isolated, this is not strictly true. Particularly with respect to the gaseous materials there is some degree of free passage between the two volumes. However, with respect to liquids, the volumes are effectively isolated from one another.

With the exception of the end chamber 27, which is provided for the purpose of enclosing optional elements such as a heater, the bulk of the interior of the enclosed volume 24 is filled by the rotor subassembly 20. The rotor subassembly 20 provides the main moving element of the assembly 10. The rotor is in the form of a generally cylindrical drum 40 formed of a rotor wall 42 which is thermally conductive in nature such that temperatures on opposing sides of the rotor wall 42 tend to equilibrate. The end of the rotor drum 40 situated nearest the bell portion 16 includes a sealing ridge 44 adapted to mate with the bell portion 16 to form a fluid seal therebetween. In the preferred embodiment this sealing ridge 44 is in the form of an actual weld to the bell portion. A central pipe 46 extends along the center axis 11 and performs the purpose of providing a structural support for the drum 40, an axis of rotation and path for fluid flow. On each end of the drum 40 a set of four support struts 48 radially extend outward from the center pipe 46 to the perimeter of the drum 40 to provide structural integrity to the device.

The rotor subassembly 20, combined with some components of the bell portion 16, serves the purpose of dividing the enclosed volume 18 into the evaporization volume 24 and the condensation volume 26. The interstices between adjacent spiral portions of the rotor wall 42 are filled in by an end cap wall 50, alternately on each end of the drum such that the interior of the drum 40 is divided into a pair intertwined spiral channels. The channels which are formed within the drum 40 are referred to as an evaporization channel 52 and a condensation channel 54. This is best understood in the illustration of FIG. 3, where the view is from the position of the end wall 14. In this case it may be seen that the evaporization channel 52 is open toward the evaporization volume 24 while the end cap wall 50 effectively closes the condensation channel 54 toward the evaporization volume 24. Conversely, the opposite end of the rotor subassembly 20 has the end cap wall 50 closing the evaporization channel 52 toward the condensation volume 26 while the condensation channel 54 is open thereto. The evaporization channel 52 and the condensation channel 54 are spirally intertwined such that in all cases a point on the rotor wall 42 within the evaporization channel 52 will be adjacent, through the rotor wall 42, to a point on the condensation channel 54. This provides maximum heat transfer between the two channels.

The spiral shape of the channels 52 and 54 is selected to both maximize effective heat exchange and to provide for continuous wetting of the surfaces. The spiral shape and continuous rotation of the drum 40 result in optimization of both of these properties.

The drum 40 acts as a heat exchanger element which is unique in that it continually rotates in operation. The spiral channels approach concentricity in shape. The alternating approximately concentic layers of the evaporation channel 52 and the condensation channel 54 transfer the heat of fluid vaporization primarily by way of conduction through the walls 42 of the heat delivered by the convective action of the visious fluid. Since the forces of gravity are more powerful than the frictional forces involved the reality is that fluids will convect primarily in the portions of the channels 52 and 54 located at the bottom of the drum 40, of course, with constant rotation, the actual segments change continuously.

Heat transfer from the condensation channel 54 to the evaporization channel 52 of the released heat of condensation (the inverse of the endothermic heat of vaporization) may occur directly by droplets of condensed liquid adhering to the rotor wall 42. The condensation step is exothermic in that it releases heat to the environment which may then be conducted through the wall 42 to the adjacent evaporization channel 52, there to aid in triggering the evaporization of the fluid contained therein.

Maximizing evaporation within the evaporization channel 52 is the primary goal of the heat exchanger/rotor subassembly 20. Accomplishing this goal requires a balancing of the competing factors of maximum surface area for conductive transfer and minimum "dry" surface area subject to formation of impurity deposits. With the constant rotation acting to repeatedly rewet the surface area the best results are obtained.

Figure 3:
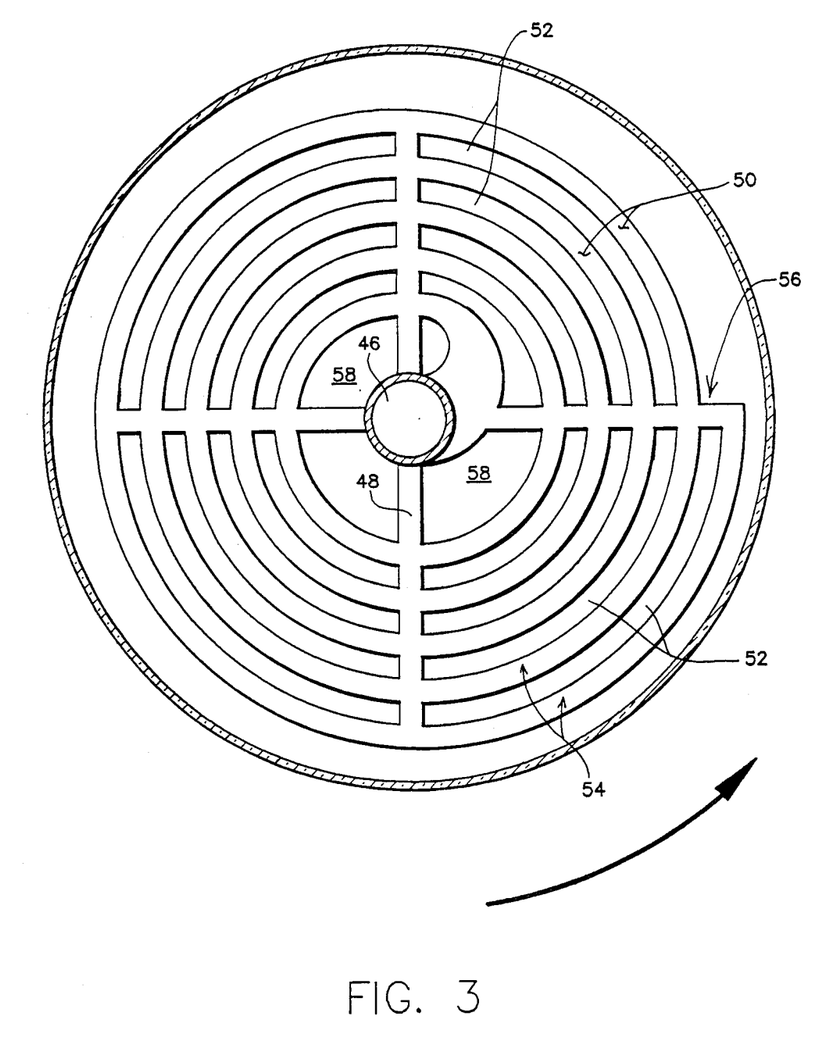
FIG. 3 is a cross-sectional view taken along line 3—3 of FIG. 1, showing the internal structure of the apparatus.

As is best seen in illustrations of FIGS. 1 and 3, the drum 40 is not perfectly cylindrical in that the evaporization channel 52 culminates in a scoop aperture 56 which is an elongated aperture extending the entire length of the rotor drum 40. In operation the rotor drum 40 turns in a counter-clockwise direction in the orientation of FIG. 3. In this orientation the scoop aperture 56 actually scoops fluid up from the bottom of the evaporization volume 24 within the cylinder wall 28 and causes the fluid to flow within the evaporization channel 52. Most of the fluid which enters the evaporization channel 52 will arrive there through the scoop aperture 56. Once captured within the evaporization channel 52 the fluid is caused by the rotation of the rotor drum 40 and the force of gravity to flow along the spiral path of the evaporization channel 52 toward the center of the rotor drum 40 where it will flow into a central tunnel 58.

A semicircular fluid flow baffle 60 is frictionally held against the end of the rotor drum 40 by a spring mechanism 62. The fluid baffle 60 abuts against the lower half of the rotor drum 40 at the end nearest the end wall 14. The fluid baffle 60 prevents a substantial portion of the fluid captured within the evaporization channel 52 from flowing back into the reservoir of uncaptured fluid within the enclosed volume 18. It is only necessary to have the fluid baffle 60 abut against the lower half of the rotor drum 40 at any given time since the force of gravity will cause nearly all of the fluid to be resident in this portion of the drum. It is noted that the drum 40 will rotate with respect to the fluid baffle 60 so that a perfect seal is not attainable, however, this is not required since it is only desirable to prevent excessive fluid flow back into the reservoir. The spring mechanism 62 exists for the purpose of urging the fluid flow baffle 60 against the end cap wall 50 and forming a relative seal.

Figure 2:
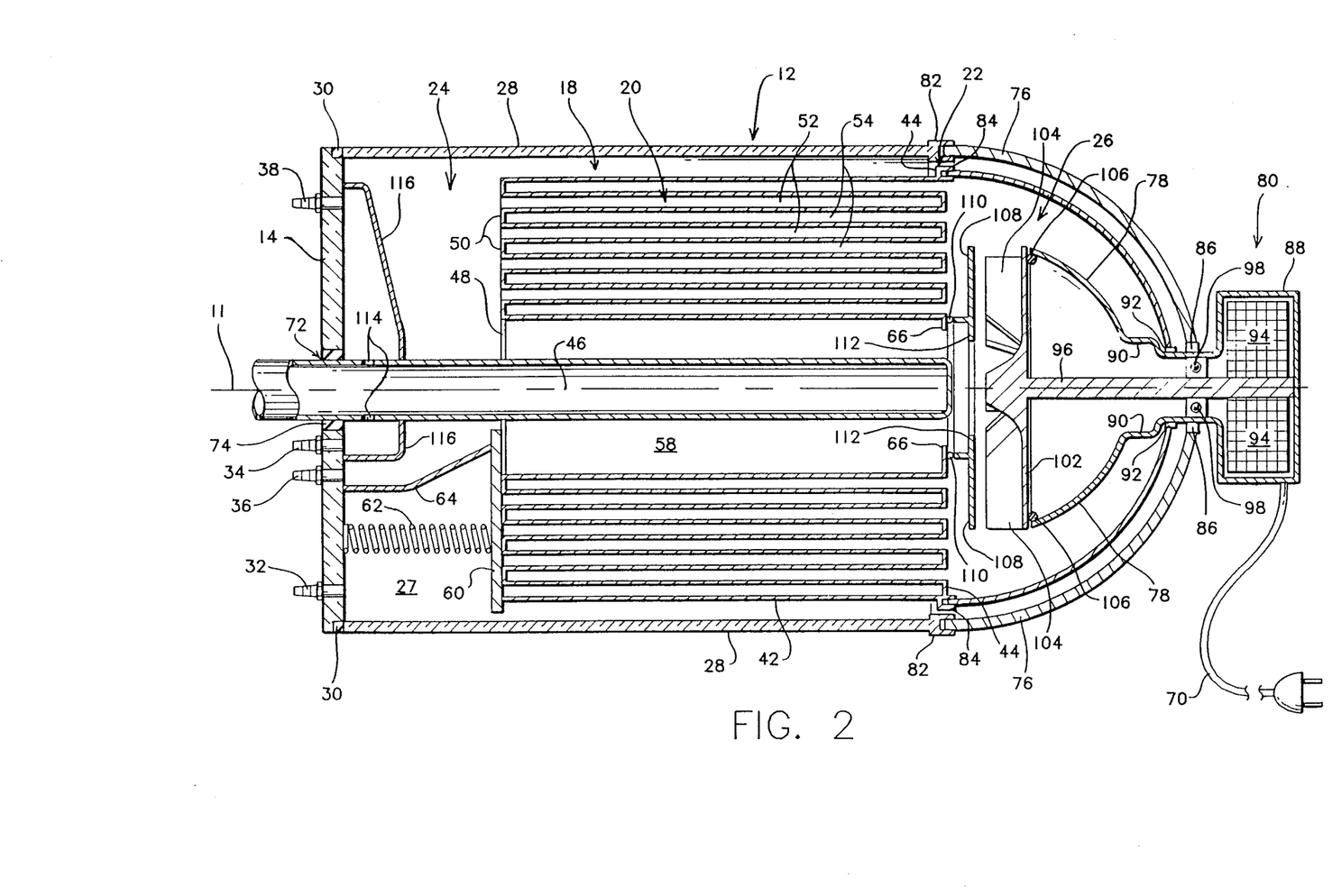
FIG. 2 is a left elevational view of the enclosure cylinder and the heat exchange rotor components of the invention.

As the fluid passed through the evaporization channel 52 a certain amount will vaporize such that it is in vapor phase by the time it reaches the central tunnel 58. The fluid which remains in liquid form will reach the central tunnel 58 and will be permitted to flow out of the evaporization end of the tunnel 58 and into a brine catcher 64. The liquid that is captured in the brine catcher 64 is outputted through the concentrated brine output port 36 which is situated in the end wall 14 near the bottom of the brine catcher 64, as shown in FIGS. 1 and 2. The end of the central tunnel 58 which is toward the bell portion 16 includes an optional low restraining ridge 66. The restraining ridge 66 narrows the diameter of the central tunnel 58 at its opening into the condensation volume 26 such that liquid does not flow into the condensation volume 26 through the tunnel 58. However, the ridge 66 only closes the opening of the tunnel 58 a small amount so that vapor may readily pass therethrough.

The motive power for turning the rotor drum 40 is provided by a drum motor 68, shown in FIG. 1 which is attached to the center pipe 46 in a manner that causes the center pipe to turn in a counter-clockwise direction, in the orientation of FIG. 3. The drum motor 68 is a standard electrical rotational motor powered by connecting a power cord 70 to the best available source of power. Since the drum motor 68 is situated outside the enclosed volume 18 it is necessary for the center pipe 46 to pass through the end wall 14 in order to engage the drum motor 68. This is accomplished by a pipe aperture 72 formed in the end wall 14 and a pipe bearing/seal 74 inserted into the aperture 72 to receive the center pipe 46. The pipe bearing seal 74 allows the center pipe 46 to rotate and further restrains liquid and gaseous flow through the pipe aperture 72.

The construction of the bell portion 16 of the apparatus 10 is best understood in relation to the illustrations of FIGS. 1 and 2. The bell portion 16 includes an outer bell 76, an inner bell 78 and a fan subassembly 80. The outer bell 76 is attached firmly but releasably to the stationary cylinder wall 28 by a first releasable seal 82. This attachment provides that the outer bell 76, the cylinder wall 28 and the end wall 14 together comprise an enclosed volume which is effectively isolated from the environment. The first releasable seal 82 is caused to be releasable so that the device may be readily disassembled for maintenance. On the other hand, the first releasable seal 82 must be of sufficient structural integrity that the outer bell 76 provides physical support to the stationary cylinder wall 28, and vice versa.

The inner bell 78, like the outer bell 76, is a hemispherical shell member. The inner bell 78 is situated within the outer bell 76 and is attached along its front peripheral edge to the sealing ridge 44 of the drum 40 by a second releasable seal 84. The connection between the inner bell 78 and the drum 40 by the second releasable seal 84 causes the inner bell 78 to rotate with the drum 40. The second releasable seal 84 is selected to be reasonably airtight to facilitate providing a substantial pressure radiant between the condensation volume 26 which exists inside the inner bell 78 and the evaporization volume 24 which exists outside the inner bell 78. The connection of the second releasable seal 84 also requires substantial structural integrity as well as being air tight since the inner bell 78 provides physical support for the right end of the rotor subassembly 20. It may be considered that the inner bell 78 is actually a component of the rotor subassembly 20 since its completes the enclosed volume of the condensation volume 26 and also provides physical support. The end support provided to the rotor subassembly 20 by the inner bell 78 substantially reduces the physical strain on the pipe bearing seal 74 and further improves rotational stability of the rotor subassembly 20 about the central axis 11.

The structural support for the entire bell portion 16 is provided by the connection between the first releasably seal 82 and the outer bell 76. At the interior periphery of the outer bell 76 it is connected by a weld 86 or similar connecting technique which forms an airtight seal to the fan subassembly 80. The o-ring 86 firmly attaches the outer bell 76 to a fan housing 88 which encloses the remainder of the fan subassembly 80. The fit between the outer bell 76, the o-ring 86 and the fan housing 88 is sufficiently tight that no relative motion occurs between the fan housing 88 and the outer bell 76 and further that the seal is essentially airtight. Directly inward from the o-ring 86, the fan housing 88 bows outward slightly to include a seating ring 90. The exteriorally smooth seating ring 90 provides a surface upon which the inner bell 78 may rotate, with the actual contact between the inner bell 78 and the seating ring 90 being accomplished by an inner bell bearing seal 92. The inner bell bearing seal 92 is in the form of a teflon sliding bearing which permits the inner bell 78 to rotate freely about the fan housing 88 while retaining a relatively airtight seal therebetween. The fan housing 88, in the preferred embodiment 10 is substantially in the shape of the "liberty bell" with the portion shaped like the metal part of the bell extending inside the bell portion 16.

The fan subassembly further includes a fan motor 94, receiving electrical power through an electrical cord 70, which is utilized to rapidly rotate a fan shaft 96. The fan shaft 96 passes into the bell portion 16 through a highspeed bearing 98 located just interiorally of the o-ring 86. The highspeed bearing 98 provides a pressure seal such that the atmospheric pressure existing at the fan motor 94 is isolated from the interior of the apparatus 10. The fan shaft 96 then continues and terminates in an impeller 100 which is formed of an impeller disk 102 having a plurality of impeller blades 104 formed thereon. The impeller blades 104 are shaped in such a manner that when the impeller 100 is spun by the fan shaft 96 any vapor or liquid impacting the impeller 100 is forced outward into the condensation volume 26 existing within the inner bell 78. A rotary seal 106 is situated at the intersection of the rotating impeller disk 102 and the stationary fan housing 88 to prevent liquid from entering the interior of the fan housing 88 and possibility causing deposits or otherwise fouling the operation of the fan subassembly 80. The spinning of the impeller 100 acts to maintain the condensation volume 26 at a lower relative pressure than the evaporization volume 24. This results in the vapor being drawn through the central tunnel 58 and causes the vapor to enter the condensation volume 26 where it may be reconverted to purified fluid.

Situated intermediate the fan blades 104 and the end of the rotor drum 40 is a vapor baffle 108. The vapor baffle 108 is attached to the rotor drum 40 in the vicinity of the restraining ridge 66 by a baffle bond 110. The vapor baffle 108 rotates with the rotor drum 40 and provides a baffle which directs the vapor from the central tunnel 58 to the impeller 100 such that it is forced outward into the condensation volume 26. The vapor baffle 108 further includes a secondary restraining ridge 112 which prevents unevaporiated liquid from splashing into the condensation volume 26 at the position of the impeller 100. The operation of the vapor baffle 108 insures that vapor which enters the condensation volume 26 does so completely and passes in near proximity to the impeller blades 104 so that it may be distributed outward by the impeller blades 104 toward the outer portions of the condensation channel 54.

Combined action of the impeller 100 and the vapor baffle 108 caused the vapor which reaches the impeller blades 104 from the central tunnel to be propelled away from the central axis 11 within the inner bell 78 such that it will be urged to enter the condensation channel spiral 54 of the rotor drum 40. Within the condensation channel 54 a substantial portion of the vapor will condense along the rotor wall 42 and will be caused by the rotation of the rotor drum 40 to eventually flow to the center of the drum 40 and enter the center pipe 46. This condensed fluid will then flow through the center pipe 46 until it reaches a point near the end wall 14 where the center pipe is provided with a series of perforations 114 through which the fluid may then exit the center pipe 46.

The fluid which exits the center pipe 46 through the perforations 114 will drip or flow into a pure fluid catcher 116 which is in the form of a sealed bladder which is formed about the center pipe 46 and attached to the end wall 14 such that liquid and vapor exiting the perforations 114 will either be directed in liquid form to the pure fluid output port 34 or in vapor form to the degassing port 38. The pure fluid catcher 116 which is situated physically within the end chamber 27 forms an additional barrier between the condensation volume 26 and the evaporization volume 24. The interior of the pure fluid catcher 116 forms a portion of the condensation volume 26 while the exterior portions are part of the end chamber 27 and thus part of the evaporization volume 24. The structure of the bladder of the pure fluid catcher 116 must be sufficiently sturdy that the relatively lower pressure in the condensation volume 26 does not cause it to collapse and occlude the perforations 114 or the ports 34 and 38 contained therein.

Figure 4:
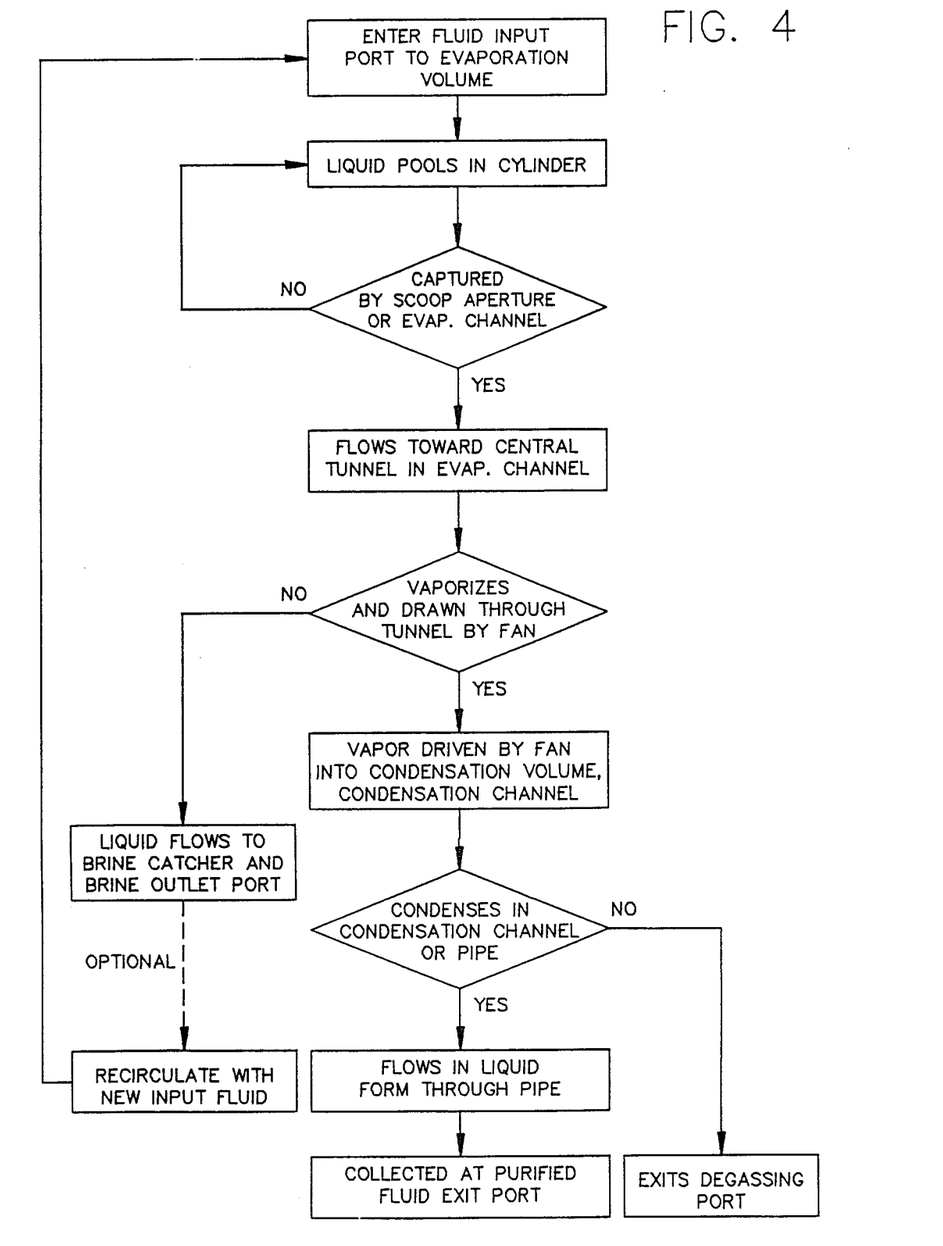
FIG. 4 is a flow chart showing the passage of a hypothetical fluid unit through the apparatus of the present invention.

The manner in which the distillation apparatus 10 operates and the interaction of the various components thereof is best understood in the hypothetical flow chart analysis set forth in FIG. 4.

FIG. 4 illustrates the passage of a hypothetical unit of impure liquid from its introduction into the apparatus to the various possible destinations. This figure illustrates the various steps and locations through which the fluid passes in either being distilled or concentrated. Since the overall process accomplished by the apparatus is a flow procedure, this illustration shows what will happen to each unit of fluid which enters the apparatus 10.

Initially, the fluid unit will enter the apparatus 10 through the fluid input port 32 and will be delivered in liquid form to the evaporization volume 24. Since the input fluid is in liquid form it will tend to pool at the bottom portion of the cylinder 12. Some portion of the liquid pooled in the bottom of the cylinder will be captured by the scoop aperture 56 as the rotor drum 40 rotates the scoop aperture 56 into position. Furthermore, if the liquid level within the cylinder 12 becomes sufficiently high certain amounts of the fluid will enter the evaporization channel 52 through the spaces between the end cap walls 50. This inward flow will be minimized by the fluid baffle 60. The liquid which is not captured by the scoop aperture 56 or the evaporization channel 52 remains in a pool in the bottom of the cylinder 12.

The liquid which has been captured within the evaporization channel 52 will then be caused by the rotation of the rotor drum 40 and the force of gravity to flow in a spiral pattern through the evaporization channel to the central tunnel 58. The force of gravity is greater than the frictional forces causing the fluid to convect along the surface of the wall 42 so most of the fluid will remain at the lowest portion of the particular spiral channel. Since this is constantly charging, however, the entire drum wall 42 surface within the evaporization channel 52 is continually rewet. This inhibits deposit and scale formation.

During this passage the liquid is in contact with the rotor drum wall 42 which is highly thermally conductive. The fluid will receive heat transfer through the rotor drum wall 42, the heat being primarily generated by the heat of condensation of fluid on the opposing side of the rotor drum wall 42. This, plus the reduced pressure on the evaporization volume created by the action of the impeller 100, causes some of the fluid to vaporize into gaseous form by the time it reaches the central tunnel 58. The degree of vaporization is dependent upon a number of factors, including the input temperature of the fluid, the pressure differential, the concentration of impurities in the fluid, the added thermal energy input to the device such as by solar heating of the cylinder, the thermal conductivity of the rotor wall 42 and the speed of rotation of the rotor drum 40, among others.

Except in extreme cases where the above factors will cause nearly complete vaporization, not the usual procedure in a flow process, a certain amount of the fluid will remain in liquid form throughout the entire passage through the evaporization channel 52 and will arrive at the central tunnel 58 still in liquid phase. This liquid is prevented by the restraining ridge 66 and the secondary restraining ridge 112 from flowing into the condensation volume 26. The speed of the fan motor 80 is selected such that it does not cause a substantial capture of liquid droplets but only draws vapor laden air into the condensation volume 26.

Since the impurities present in the initial fluid are typically minerals or other items having substantially higher evaporization points than the fluid itself, these will not be caused to vaporize and the resulting fluid that reaches the central channel will be in concentrated form. This fluid, which has a much higher concentration of impurities than the initial input fluid is known as "brine". The structure of the apparatus 10 is such that the brine will flow out the open end of the central tunnel 58 and flow into the brine catcher 64. From the brine catcher 64 the brine will then flow out of the apparatus 10 via the concentrated brine output port 36.

As shown in FIG. 4, one of the options of available for usage of the brine which exits the brine catcher 64 is to recirculate it into the input fluid for reintroduction through the fluid input port 32. It is expected that this sort of approach will be optionally utilized in situations where, for whatever reason, the evaporization efficiency is particularly low or in situations where the available volume of input fluid is limited.

That portion of the input fluid which is in vapor form when it reaches the central tunnel 58 will be primarily drawn by the action of the impeller 100 through the condensation end of the central tunnel 58 and into the condensation volume 26. The action of the impeller 100 will cause the vapor laden air to be dispersed outward from the center axis 11 and beyond the vapor baffle 108. The vapor baffle 108 prevents the vapor from being blown back through the central tunnel 58 into the evaporization volume 24. The vapor which is delivered into the condensation volume 26 is then either blown directly into the condensation channel 54, or driven against the interior of the inner bell 78. In this manner, the vapor laden air will come into contact with the rotor wall 42 or the wall of the inner bell 78, both of which are highly thermally conductive materials. Since the air pressure within the condensation volume 26 is higher than that within the evaporization volume 24, the fluid in vapor form is driven to condense on the rotor wall 42 or the wall of the inner bell 78. The likelihood of this condensation is enhanced because the material of the rotor wall 42 transfers the negative heat of vaporization from the evaporization channel 52 to the corresponding points in the condensation channel 54. The rate of condensation will be dependent on essentially the same factors as the rate of evaporization in the evaporization channel 52, but in an inverse fashion.

That amount of vapor which does condense either in the condensation channel 54 itself or in the inner bell 78 will flow into the condensation channel 54 and be driven by the rotation of the rotor drum 40 and the force of gravity to flow within the condensation channel 54 in a spiral fashion until it reaches the center pipe 46. During this passage a good portion of the heat generated by the condensation phase change will be transferred through the rotor wall 42 to the fluid on the opposing side, which is urged to evaporate.

The condensed fluid which is again in liquid phase will reach the center pipe 46 and will flow therethrough to the perforations 114 in the center pipe 46 and then to the pure fluid catcher 116 and the purified fluid output port 34. At this point it may be captured and utilized as drinking water or whatever type of purified use is required in the particular situation.

A certain portion of the vaporized fluid will not be condensed during its passage through the condensation channel 54 in the center pipe 46. This will also escape through the perforations 114 and will be captured in the purified fluid catcher/bladder 116. The vapor entering the pure fluid catcher bladder 116 will exit the apparatus 10 through the degassing port 38.

The degassing port 38 will have primarily utility in situations where some of the impurities of concern within the input fluid have a lower vaporization temperature than that of the primary fluid. When the impurities of concern are organic solvents and the like having lower vaporization points than the primary fluid these will be in a considerably higher concentration in the vapor exiting the perforations 114 than in the ambient air. Thus it is sometimes desirable to apply negative pressure to the degassing port in order to preferentially draw these impurity laden vapor fractions out of the apparatus 10 through the degassing port 38. The vapor exiting through the degassing port may then be released or treated in whatever manner is desired by the user. Because of the pressure differential there may still exist a substantial partial pressure of purified fluid vapor in the vapor exiting the degassing port 38. A secondary condensation path may thus be optionally useful at this point.

Negative pressure applied to the apparatus 10 via the degassing port 38 also is useful in maximizing the pressure differential between the condensation volume 26 and the evaporization volume 24, thus enhancing the distillation process.

As is apparent from the above discussion, the process is a continuous flow with various options available to a given molecule or unit of entering fluid. Depending on a variety of factors, selected by the user for the particular purpose involved, varying ratios of purified fluid, concentrated brine and concentrated vapor outputs may be obtained from the apparatus 10. Once these factors have been empirically balanced the apparatus will operate in a continuous steady flow manner.

Although a wide variety of materials and dimensions may be utilized with the present invention the preferred embodiment 10 has its end wall 14 and cylinder wall 28 constructed of Plexiglas for transparency both to visual and infrared radiation. The rotor drum 40 and inner bell 78 are constructed of a thermally conductive material such as stainless steel or thin-walled aluminum. The impeller 100 and fan housing 88 are selected to be of some material which is not readily corroded or degraded by the selected input fluid.

In the preferred embodiment the cylindrical portion 12 has an outside diameter of 30.1 cm (12.0 in) and an inside diameter of 28.9 cm (11.5 in). The sealing ridge 44 on the rotor drum 40 has a maximum diameter of 27.6 cm (11.0 in) while the central tunnel 58 has an approximate diameter of 8.8 cm (3.5 in). This restraining ridge 66 has a height of 0.63 cm (0.25 in) while the vapor baffle 108 has a cylinder diameter of 7.5 cm (3.0 in) and a flange diameter of 17.6 cm (7.0 in).

For the primary expected usage of water purification the drum motor 68 is selected to have a rotational speed of approximately 30 rpm while the fan motor 80 is selected to have a rotational speed of approximately 7000 rpm.

It is envisioned that in order for it to effectively capture brine, the brine catcher 64 will be constructed of an accordion type fabric such that it may be kept tight against the exterior facing side of the fluid baffle 60 and capture the maximum amount of the brine.

Those skilled in the art will readily observe that numerous modifications and alterations of the device may be made while retaining the teachings of the invention. Accordingly, the above disclosure is not intended as limiting. The appended claims are therefore to be interpreted as encompassing the entire spirit and scope of the invention.

INDUSTRIAL APPLICABILITY

The fluid distillation apparatus 10 of the present invention is adapted for utilization in distilling and purifying input fluids of a wide variety and containing a broad spectrum of impurities. Although the primary expected utilization of the preferred embodiment 10 is for the continuous provision of potable water from sources which are brackish or otherwise contaminated, it is also envisioned that the device may be utilized with other fluids and other types of impurities. Because of the existence of the brine capture features and the degassing port 38 feature, it is even possible to envision utilizations in which the byproducts which are obtained through these ports will be of at least equal importance to the purified fluid captured at the purified fluid output port 34.

The inventor presently visualizes utilization of the invention for such purposes as drinking water provision in remote locations such as ocean going vessels and seaside locations. It may also be utilized for drinking water purification by those whose primary access to water is through contaminated sources. Scientific applications are also envisioned.

In light of the above, and especially in light of the compact unitary design, ease of disassembly and cleaning, low power usage and relatively inexpensive construction of the preferred embodiment, it is expected that the invention of the fluid distillation apparatus 10 of the present invention will enjoy widespread commercial utility and industrial applicability.

I claim:

1. A fluid distiller comprising:
   a cylindrical hollow frame symmetrical about a longitudinal axis;
   a hemispherical bell portion mating with one end of the frame;
   an end wall mating with the end of the frame opposing the bell portion to form, with the frame and the bell portion, an enclosed volume;
   a heat exchange drum situated within said enclosed volume so as to be aligned coaxially with the frame about said longitudinal axis, the drum being formed to include a first channel and a second channel, convolutedly adjacent to but isolated from said first channel along the respective lengths thereof, said first and second channels being connected at one respective end thereof by a vapor passage permitting gases to flow from said first to said second channel while preventing substantial liquid flow therethrough, the material of the drum being thermally conductive such that temperature disparities between adjacent surfaces of said first and second channels are minimized;
   rotational motive means for rotating the drum about said longitudinal axis with respect to the frame such that fluid situated within said enclosed volume tends to be captured by a scoop aperture situated on the periphery of the drum, said scoop aperture forming a portion of said first channel, the rotation of the drum further urging fluid within said first channel to flow radially inward toward said vapor passage and urging fluid condensing within said second channel to flow radially inward toward the fluid output means.
   pressure gradient means for urging gaseous material to flow through said vapor passage from said first channel to said second channel;
   input means for introducing impure fluids into said enclosed volume in such a manner that the impure fluids may be captured within said first channel but not within said second channel; and
   fluid output means for outputting distilled fluids condensing within said second channel.

2. The fluid distiller of claim 1 wherein
   the arrangement of said first and said second channels within the heat exchange drum is in the nature of a pair of intertwined spiral channels, with the inner wall of each interior channel segment being common with the outer wall of an adjacent channel segment of the other said channel such that heat is exchanged through said wall between said channels.

3. The fluid distiller of claim 1 wherein
   the fluid output means includes a center pipe formed about said longitudinal axis, said center pipe forming a portion of said second channel, and a collection means for capturing fluid within said center pipe and delivering said fluid to a location exterior to said enclosed volume.

4. The fluid distiller of claim 3 wherein
   said collection means includes one or more perforations formed in said center pipe near the end wall, a fluid catcher for receiving fluid exiting said center pipe through said perforations, and an outlet port formed in the end wall for receiving fluid from said fluid catcher.

5. The fluid distiller of claim 1 wherein
   the hemispherical bell portion includes a stationary outer bell sealed to the frame and an inner bell sealed to the heat exchange drum so as to rotate therewith, the volume within said inner bell being isolated from the volume intermediate said inner bell and said outer bell except for the vapor passage.

6. The fluid distiller of claim 5 wherein
   the pressure gradient means includes an impeller operating within said inner bell.

7. The fluid distiller of claim 1 wherein
   the material of the frame is at least partially transparent to visible and infrared electromagnetic radiation.

8. The fluid distiller of claim 1 wherein
   said mating of the bell portion and the end wall to the frame is releasable such that the distiller may be readily disassembled.

9. The fluid distiller of claim 1 and further including
   a degassing port for removing gaseous material from said enclosed volume.

10. The fluid distiller of claim 1 and further including
    brine capture means for capturing nonevaporated fluid which has passed completely through said first passage and delivering said nonevaporated fluid to a location exterior to said enclosed volume.

11. The fluid distiller of claim 1 wherein
    said longitudinal axis is substantially horizontally arrayed and the input means includes an input port formed in the end wall below said longitudinal axis and a fluid baffle for abutting against the drum such that fluid residing in said enclosed volume is prevented from directly flowing into said first and second channels.

12. A fluid distillation apparatus comprising:
    a hollow vessel;
    a cover adapted to mate with the hollow vessel to form therewith an enclosed chamber;
    dividing means for separating said enclosed chamber into a first volume and a second volume;
    thermally conductive convolution means for juxtaposing surfaces of said first volume and said second volume, the thermally conductive convolution means including a spiral drum including a first spiral passage open to said first volume and a second spiral passage intertwined with said first spiral passage, said second spiral passage being open to said second volume;
    a vapor passage extending between said first volume and said second volume such that gases may freely pass therethrough while liquids are inhibited from passing therethrough;
    rotational means for rotating said drum about its longitudinal axis such that fluids within said first and second spiral passages are urged to flow inward toward said longitudinal axis;
    pressure gradient means for causing gases to flow from said first volume to said second volume;

collector means for collecting liquid condensing within said second volume;

first port means for introducing impure fluid into the first volume; and second port means for output distilled fluid from said collector means.

13. The distillation apparatus of claim 12 wherein the pressure gradient means includes a fan situated within said second volume to draw vapor into said second volume through the vapor passage.

14. The distillation apparatus of claim 12 wherein the collector means includes a center pipe within said drum, said center pipe being connected to said second spiral passage so as to receive liquids condensing within said second spiral passage, and an outlet port for receiving fluid from said center pipe.

15. The distillation apparatus of claim 12 wherein the collector means includes a center pipe within said drum, said center pipe being connected to said second spiral passage so as to receive liquids condensing within said second spiral passage and an outlet port for receiving fluid from said center pipe.

16. The distillation apparatus of claim 15 wherein said first spiral passage is connected to the vapor passage which is formed about said center pipe.

17. A heat exchanger and fluid purification apparatus for receiving inputted impure fluids and outputting purified fluids, comprising:

an elongated cylindrical tube formed about a longitudinal axis and being formed of a material which is at least partially transparent to electromagnetic radiation in the visible and infrared spectra;

an end wall for releasably mating with one end of the cylindrical tube, the end wall including input and output port means for respectively inputting impure fluids to and outputting purified fluids from the apparatus;

a bell assembly for releasably mating with the end of the cylindrical tube opposite the end wall so as to form therewith an enclosed volume, the bell assembly including an outer bell, for mating with the cylindrical tube, and an inner bell rotatably mounted and sealed therewithin such that the interior and exterior of said inner bell are isolated from each other;

divider means situated within said enclosed volume for dividing said enclosed volume into an evaporization volume and a condensation volume, the divider means being in the form of a rotatable heat conductive drum formed about said longitudinal axis, said drum including an evaporization channel in the form of a radially spiral channel extending longitudinally along the length of said drum, said evaporization channel being open at one longitudinal end thereof to the end of the enclosed volume toward the end wall so as to form a portion of said evaporization volume, and a condensation channel formed spirally so as to intertwine with said evaporization channel such that the wall material of said drum separates said respective channels along their spiral length to conductively exchange heat through said wall material between said respective channels, said condensation channel being open at its longitudinal end toward said inner bell so as to form therewith a portion of the condensation volume, a vapor passage connecting the interior spiral end of said evaporization channel to the interior of said inner bell, said vapor passage including fluid flow restricting means to prevent the free flow of liquid therethrough into said condensation volume, and purified fluid delivery means situated at the interior spiral end of said condensation channel for receiving purified fluid condensing with said condensation volume and delivering it to location exterior to said enclosed volume, rotational motive means to rotate said drum about said longitudinal axis such that liquid within said respective channels is urged to flow toward the interior spiral ends thereof; and pressure gradient means to urge vapor evaporated in said evaporization volume to flow through said vapor passage into said condensation volume and to urge condensation of said vapor to liquid phase within said condensation volume.

* * * * *